(12) United States Patent
Michalewich et al.

(10) Patent No.: US 12,377,320 B2
(45) Date of Patent: *Aug. 5, 2025

(54) GOLF BALL COMPONENTS FORMED FROM HYDROXYURETHANE COMPOSITIONS

(71) Applicant: Acushnet Company, Fairhaven, MA (US)

(72) Inventors: Michael Michalewich, Norton, MA (US); Manjari Kuntimaddi, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,780

(22) Filed: Jun. 10, 2024

(65) Prior Publication Data

US 2024/0325828 A1 Oct. 3, 2024

Related U.S. Application Data

(63) Continuation of application No. 18/102,305, filed on Jan. 27, 2023, now Pat. No. 12,005,319.

(51) Int. Cl.
| | |
|---|---|
| *A63B 37/06* | (2006.01) |
| *A63B 37/00* | (2006.01) |
| *C08G 18/32* | (2006.01) |
| *C08L 75/02* | (2006.01) |
| *C08L 75/04* | (2006.01) |

(52) U.S. Cl.
CPC ...... *A63B 37/0027* (2013.01); *A63B 37/0039* (2013.01); *C08G 18/3203* (2013.01); *C08L 75/02* (2013.01); *C08L 75/04* (2013.01)

(58) Field of Classification Search
CPC .................................................. A63B 27/0023
See application file for complete search history.

(56) References Cited

U.S. PATENT DOCUMENTS

| | | | |
|---|---|---|---|
| 4,798,386 | A | 1/1989 | Berard |
| 4,871,589 | A | 10/1989 | Kitaoh et al. |
| 5,000,458 | A | 3/1991 | Proudfit |
| 5,006,297 | A | 4/1991 | Brown et al. |
| 5,300,325 | A | 4/1994 | Nealon et al. |
| 5,334,673 | A | 8/1994 | Wu |
| 5,409,233 | A | 4/1995 | Kennedy |

(Continued)

FOREIGN PATENT DOCUMENTS

EP 1 070 733 1/2001

OTHER PUBLICATIONS

Beniah, Goliath, et al., "Non-Isocyanate Polyurethane Thermoplastic Elastomer: Amide-Based Chain Extender Yields Enhanced Nanophase Separation and Properties in Polyhydroxyurethane", Macromolecules, American Chemical Society, May 22, 2017, pp. 4425-4434.

(Continued)

*Primary Examiner* — Raeann Gorden
(74) *Attorney, Agent, or Firm* — Bradley Arant Boult Cummings LLP

(57) ABSTRACT

Thermoplastic and thermoset compositions including hydroxyurethane linkages, golf ball components formed using such thermoplastic or thermoset compositions, and golf balls including such golf components.

20 Claims, 3 Drawing Sheets

(56) References Cited

U.S. PATENT DOCUMENTS

| | | | |
|---|---|---|---|
| 5,461,109 | A | 10/1995 | Blair et al. |
| 5,992,135 | A | 11/1999 | Benway |
| 6,120,905 | A | 9/2000 | Figovsky |
| 6,132,324 | A | 10/2000 | Hebert et al. |
| 6,315,915 | B1 | 11/2001 | Hebert et al. |
| 6,340,503 | B1 | 1/2002 | Simonds et al. |
| 6,677,401 | B2 | 1/2004 | Boehm et al. |
| 6,992,135 | B2 | 1/2006 | Boehm et al. |
| 9,260,564 | B2 | 2/2016 | Lombardo et al. |
| 12,005,318 | B1 * | 6/2024 | Michalewich ... A63B 37/00221 |
| 12,005,319 | B1 * | 6/2024 | Michalewich ..... C08G 18/3203 |
| 2007/0173348 | A1 | 7/2007 | Rajagopalan et al. |
| 2010/0255934 | A1 | 10/2010 | Rajagopalan et al. |
| 2014/0274473 | A1 | 9/2014 | Yontz et al. |
| 2017/0246511 | A1 | 8/2017 | Ricci et al. |

OTHER PUBLICATIONS

Kathalewar, Mukesh S., et al., "Non-Isocyanate Polyurethanes: From Chemistry to Applications", The Royal Society of Chemistry, 2013, pp. 4110-4129.

Leitsch, Emily K., "Polyurethane/Polyhydroxyurethane Hybrid Polymers and Their Applications as Adhesive Bonding Agents", 2019, pp. 1-24, https://www.sciencedirect.com/science/article/piiS0143749615001372e72112fb0155f334c95dc02d6704046d.

Lambeth, Robert H., et al., Nonisocyanate Polyurethanes From Six-Membered Cyclic Carbonates: Catalysis and Side Reactions, Journal of Applied Polymer Science, 2017, pp. 1-7.

Notice of Allowance dated Feb. 7, 2024 of corresponding U.S. Appl. No. 18/102,305, filed Jun. 27, 2023 entitled "Golf Ball Components Formed From Hydroxyurethane Compositions".

* cited by examiner

GOLF BALL COMPONENTS FORMED FROM HYDROXYURETHANE COMPOSITIONS

FIELD OF THE INVENTION

The present disclosure relates generally to thermoplastic and thermoset polyurethane compositions that, when used in golf balls, provide a finished golf ball desirable aerodynamic characteristics. More particularly, the present disclosure relates to thermoplastic and thermoset compositions that include hydroxyurethane linkages, golf ball components formed using such thermoplastic or thermoset compositions, and golf balls including such golf components. The compositions of the present disclosure may also include urethane and/or urea linkages.

BACKGROUND OF THE INVENTION

The performance and/or durability of a golf ball is affected by a variety of factors including the materials, weight, size, dimple pattern, and external shape of the golf ball. Golf ball manufacturers are constantly tweaking the materials and construction of a ball in an effort to make incremental gains in performance and/or durability. In this aspect, most multi-piece, solid golf balls today include at least a solid inner core made of natural or synthetic rubber protected by a single or dual cover. Cover layers may be made of a variety of materials including ethylene acid copolymer ionomers, polyamides, polyesters, polyurethanes, and polyureas.

Thermoplastic and thermoset elastomeric compositions are commonly used in cover layers of a golf ball to achieve certain desired performance characteristics and durability. In fact, thermoplastic and thermoset elastomers allow manufacturers a variety of design options in that generally such elastomers have "rubber-like" qualities without the need for vulcanization, can be processed like thermoplastics, and offer wide ranges of hardness and elasticity. In general, polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer may be extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments (formed by the reaction of the diisocyanate and low molecular weight chain-extending diol) are relatively stiff and immobile. The soft segments (formed by the reaction of the diisocyanate and long chain diol) are relatively flexible and mobile. Because the hard segments are covalently coupled to the soft segments, they inhibit plastic flow of the polymer chains, thus creating elastomeric resiliency.

In this regard, golf ball components formed from compositions including polyurethane are commonly used to form golf balls to achieve desirable resiliency, durability, and performance properties, e.g., spin and COR. Such compositions are either cast using a thermosetting elastomer or injection-molded using a thermoplastic elastomer. Indeed, thermoplastic polyurethanes have good processability and may have a feel that is preferred by golfers, whereas thermoset polyurethanes may be tougher and more durable than its thermoplastic counterpart.

As a result of the favorable properties, polyurethanes are also employed as coating layers for golf balls. For example, a golf ball may include a thin, clear coating layer formed from polyurethane. Whether used for structural layers or coating layers, polyurethanes used in golf ball manufacturing are generally formed by the reaction between an isocyanate-containing component and an isocyanate-reactive component. However, the isocyanate-containing component is highly reactive to moisture and may have other processing drawbacks. Thus, elastomeric compositions formed with isocyanate-containing components, such as conventional polyurethane, may be difficult to control from a reaction standpoint depending on the conditions of the manufacturing site.

Thus, there is a need in the art for improved thermoplastic and thermoset polyurethane compositions for use in golf balls. Indeed, it would be advantageous to have thermoplastic and thermoset compositions for use in golf balls that have decreased moisture sensitivity while still possessing attributes similar to conventional, isocyanate-based polyurethane and polyurea compositions. The present invention provides such compositions and golf balls including components made with such compositions.

SUMMARY OF THE INVENTION

The present invention relates to a golf ball, including: a core; and a cover disposed on the core, wherein the cover is formed from a reaction product of at least one cyclic carbonate and at least one amine-terminated component, wherein the reaction product includes hydroxyurethane linkages. In some aspects, the cyclic carbonate includes a five-membered cyclic carbonate, a six-membered cyclic carbonate, or a combination thereof. The cyclic carbonate may include a cyclocarbonate functionality of equal to or greater than 2.

In one embodiment, the amine-terminated component includes two primary functional amines at terminal ends of a polyol backbone. The polyol backbone may include a polyether polyol backbone. The amine-terminated component may include three primary amine functional groups.

In some embodiments, the cover is formed from a reaction product of at least one cyclic carbonate, at least one amine-terminated component, and a chain extender. In other embodiments, the chain extender includes a diamide-diamine. In yet other embodiment, the composition further includes organic units joined by at least one of the following linkages:

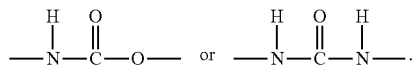

The present disclosure also relates to a golf ball, including a core and a cover, wherein the cover is formed from a composition including hydroxyurethane linkages and urethane linkages, wherein the ratio of hydroxyurethane linkages to urethane linkages ranges from 50:1 to 2:1, and wherein the composition includes a first reaction product of at least one cyclic carbonate and at least one amine-terminated component and a second reaction product of an isocyanate-containing component and an isocyanate-reactive component.

In some embodiments, the first reaction product further includes a chain extender. In other embodiments, the chain extender includes a diamide-diamine. In still other embodiments, the cyclic carbonate includes a five-membered cyclic carbonate, a six-membered cyclic carbonate, or a combination thereof. In yet other embodiments, the amine-terminated component includes two primary functional amines at each end of a polyether polyol backbone. The polyether polyol may include polyoxytetramethylene glycol (PTMEG), polyoxyethylene glycol (PEG), polyethylene propylene glycol, polyoxypropylene glycol (PPG), or mixtures thereof. In still other embodiments, the golf ball also includes a layer disposed between the core and the cover. In yet other embodiments, the layer includes an ionomer material.

The present disclosure also relates to a golf ball, including a core and a cover, wherein the cover is formed from a composition including hydroxyurethane linkages and urea linkages, wherein the ratio of hydroxyurethane linkages to urea linkages ranges from 50:1 to 2:1, and wherein the composition includes a first reaction product of at least one cyclic carbonate, at least one amine-terminated component, and an amine-terminated chain extender, and a second reaction product of an isocyanate-containing component and an isocyanate-reactive component.

In some embodiments, the amine-terminated chain extender includes a diamine-diamide. In other embodiments, the cyclic carbonate includes trimethylene carbonate, 5-(2-propenyl)-1,3-dioxan-2-one, 1,2-bis[3-(1,3-dioxan-2-one-5-yl)-propylthio]ethane, divinyl benzene dicyclocarbonate, or a combination thereof. In still other embodiments, the amine-terminated component includes two primary amine functional groups. In yet other embodiments, the golf ball further includes a layer disposed between the core and the cover. The layer may include an ionomer material.

The present disclosure also relates to a method of forming a golf ball, including the steps of:
providing a golf ball sub-assembly including at least one core layer;
forming a first reaction product including hydroxyurethane linkages from the reaction product of a cyclic carbonate, an amine-terminated component including two primary amine functional groups, and a chain extender;
adding an isocyanate-containing component to the first reaction product to form a second reaction product including hydroxyurethane and urethane and/or urea linkages; and
forming a cover disposed about the sub-assembly, the cover including the second reaction product.

In some embodiments, the step of forming a first reaction product includes providing a cyclic carbonate includes a five-membered cyclic carbonate, a six-membered cyclic carbonate, or a combination thereof. In other embodiments, the isocyanate-containing component is a blocked isocyanate. In still other embodiments, the step of adding further includes the step of exposing the isocyanate groups to crosslinking. In yet other embodiments, the step of forming a first reaction product includes providing an amine-terminated component including two primary amine functional groups at the ends of a polyol backbone. The second reaction product may include a ratio of hydroxyurethane linkages to urethane and/or urea linkages of 50:1 to 2:1.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
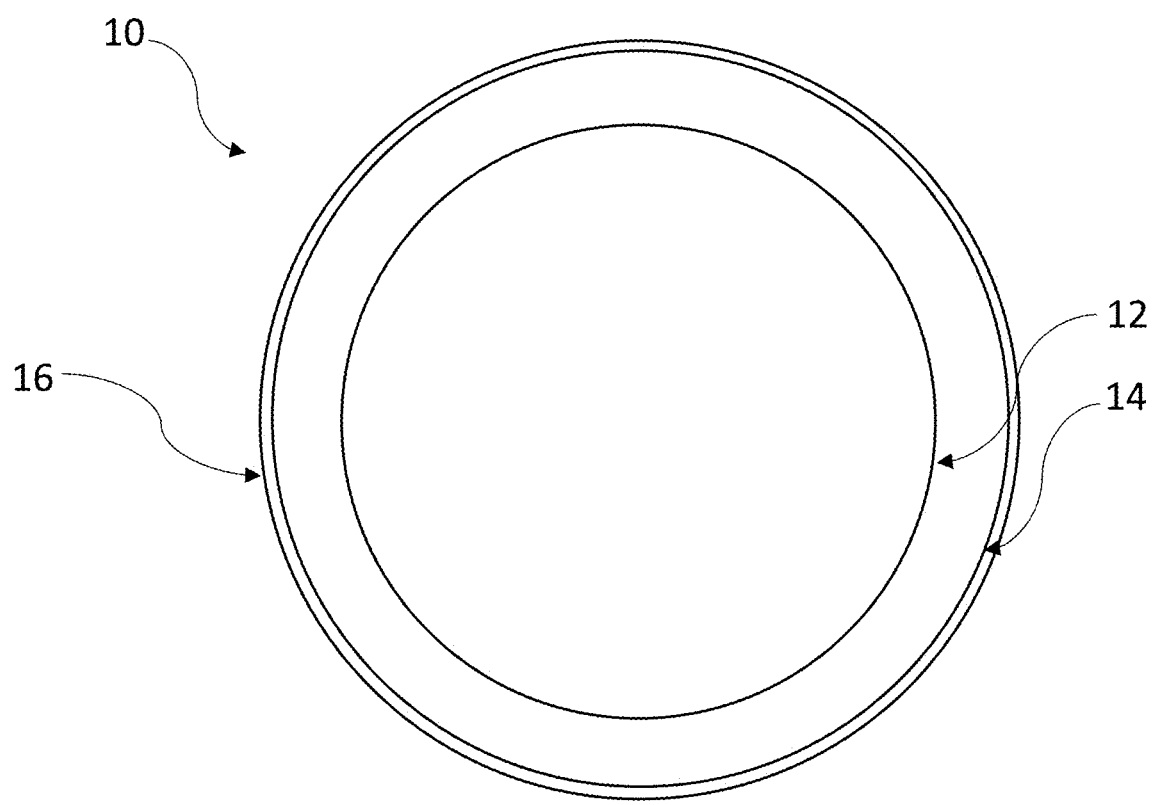
FIG. 1 is a cross-sectional view of a three-piece golf ball in accordance with an embodiment of the present disclosure.

The present disclosure relates to thermoplastic and thermoset hydroxyurethane compositions for use in golf balls. In particular, the compositions of the present disclosure have decreased moisture sensitivity while still providing desirable performance attributes. More specifically, the compositions of the present disclosure may be used to form a layer of a golf ball. The compositions and the components and golf balls formed therefrom are discussed in more detail below.

Hydroxyurethane Polyurethane Compositions

The compositions of the present disclosure include organic units joined by hydroxyurethane linkages. Hydroxyurethane linkages have a secondary or primary alcohol group adjacent to the traditional urethane linkage. For example, a composition of the present disclosure may include the following linkages:

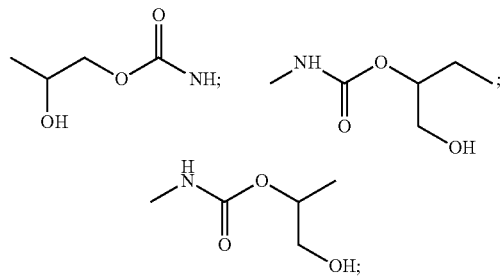

and combinations thereof.

The compositions of the present disclosure are also defined by the soft and hard segments therein. However, unlike the isocyanate-containing hard and soft segments in a conventional polyurethane, the hard segment in a composition of the present disclosure is formed from a cyclic carbonate and the soft segment is formed from an amine-terminated component. Thus, the polyurethane composition of the present disclosure can be the reaction product of an amine-terminated component and a cyclic carbonate. In some aspects, the hard segment also includes a chain extender extend the chain length of the polymer and build-up its molecular weight. Without being bound by any particular theory, the use of a chain extender may help to improve the thermal and mechanical properties of the resulting polyurethane composition. As discussed in more detail below, the chain extender may be a single chain-extender or blend of chain-extenders.

In some embodiments, the hydroxyurethane compositions are substantially free of isocyanate. As used herein the term "substantially free" means that isocyanate-containing components are used in an amount of less than about 1 percent by weight of the composition. In some embodiments, the compositions of the present disclosure include less than 0.1 percent by weight isocyanate based on the total weight of the composition. In other embodiments, the compositions of the present disclosure are free of isocyanate.

In other embodiments, the hydroxyurethane compositions include hydroxyurethane linkages, as well as urethane and/or urea linkages. Such hybrid hydroxyurethane compositions may be formed using a blocked or unblocked isocyanate, as discussed in more detail below.

Amine-Terminated Component

The amine-terminated component that forms that the soft segment of the hydroxyurethane may include a backbone with at least two primary or secondary amine functional groups. It can be a monomer or a prepolymer. In one embodiment, the amine-terminated component includes two or more primary amine functional groups are located at the ends of the backbone. The backbone may be any suitable backbone chain structure including saturated or unsaturated, and linear, branched, or cyclic.

In some embodiments, the amine-terminated component is aliphatic. In some embodiments, the backbone of the amine-terminated component includes a polyol. In this aspect, any polyol available to one of ordinary skill in the art is suitable for use. The polyol may be a diol or triol. The polyol may be used solely, or two or more of the polyols may be used in combination. Nonlimiting examples of polyols include polyether polyols, hydroxy-terminated polybutadiene (including partially/fully hydrogenated derivatives), polyester polyols, polycaprolactone polyols, polycarbonate polyols, and acrylic polyols. In one embodiment, the polyol includes a polyether polyol such as polyoxytetramethylene glycol (PTMEG), polyoxyethylene glycol (PEG), polyethylene propylene glycol, polyoxypropylene glycol (PPG), and mixtures thereof.

In one aspect, the backbone includes PEG and the amine-terminated component has the following structure:

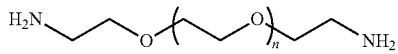

where n represents the degree of polymerization and is a natural number of 1 to 20. In one embodiment, n ranges from 1 to 12. In another embodiment, n ranges from 1 to 8. As would be understood by a person of ordinary skill in the art, n relates to the amount of amine-terminated component used, e.g., when the amine-terminated component is included in an amount of about 20 mol percent, n may be less than when the amine-terminated component is included in an amount of about 5 mol percent.

In another aspect, the backbone includes PTMEG and the amine-terminated component has the following structure:

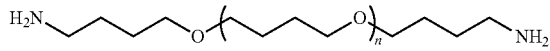

where n represents the degree of polymerization and is a natural number of 1 to 10. In one embodiment, n ranges from 1 to 8. In another embodiment, n ranges from 1 to 5. In still another embodiment, n ranges from 1 to 4. As discussed above, when the amine-terminated component is included in a relatively large amount (e.g., about 20 mol percent), n may be less than when the amine-terminated component is included in a smaller amount (e.g., about 5 mol percent). In yet another aspect, the amine-terminated component includes repeating oxypropylene units in the backbone and primary amine groups located on secondary carbon atoms at the end of the aliphatic polyether chains:

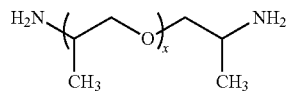

where x may range from 1 to 100. In one embodiment, x ranges from 1 to 70. In another embodiment, x ranges from 1 to 50.

In another embodiment, the polyol includes a polyester polyol such as polyethylene adipate (PEA), polybutylene adipate (PBA), and polyhexamethylene adipate (PHMA). In still another embodiment, the polyol includes a polycaprolactone polyol such as poly-ε-caprolactone (PCL). In yet another embodiment, the polyol includes a polycarbonate polyol such as polyhexamethylene carbonate. In still another aspect, the amine-terminated component is amine-terminated polybutadiene-co-acrylonitrile. In yet another aspect, the amine-terminated component is amine-terminated PPG. In other embodiments, the amine-terminated component is ethylenediamine, hexamethylenediamine, tris(2-aminoethyl)amine and polyamines such as polyoxypropylene triamine.

Cyclic Carbonate

The present disclosure is not limited by the use of a particular cyclic carbonate other than the cyclic carbonate has a cyclocarbonate functionality of equal to or greater than 2. In some embodiments, the cyclocarbonate has only cyclocarbonate functionality, In other embodiments, the cyclocarbonate backbone includes epoxy, hydroxyl, and/or other functional groups. Nonlimiting examples of suitable cyclic carbonates for use in forming the compositions of the present disclosure include cyclic carbonate functional oligomers, and prepolymers, bis-cyclic carbonate functional oligomers, carbonate soyabean oil and/or linseed oil containing cyclic carbonates, cyclic carbonate functional $SiO_2$ nanoparticles, and combinations thereof.

In some embodiments, the cyclic carbonates are five-membered cyclic carbonates, six-membered cyclic carbonates, seven-membered cyclic carbonates, or combinations thereof. Without being bound by any particular theory, five-membered cyclic carbonates are less reactive than six-membered cyclic carbonates. In this aspect, six-and seven-membered cyclic carbonates are expected to provide higher polymerization rates than five-membered cyclic carbonates. As such, the amount of the various homologues of the cyclic carbonate may vary depending on the reactivity.

In one embodiment, the cyclic carbonate is a five-membered cyclic carbonate compound synthesized through the reaction of alkali metal hydrogen carbonates with oxiranes. In another embodiment, the cyclic carbonate is a five-membered cyclic carbonate compound synthesized through transesterification of 1,2-glycols with ethylene carbonate. In another embodiment, the cyclic carbonate is synthesized from dimethyl carbonate. In still another embodiment, the cyclic carbonate is a five-membered cyclic carbonate compound synthesized through the reaction of oxiranes with butyrolactone. In yet another embodiment, the cyclic carbonate is a five-membered cyclic carbonate compound synthesized by the direct reaction of an epoxy with carbon dioxide.

In some embodiments, the cyclic carbonate may be trimethylol propane tris(glycerol carbonate) ether, triglycidyl isocyanurate carbonate, and the like.

In still other embodiments, the cyclic carbonate is a five-membered cyclic carbonate functional oligomer. In this aspect, the cyclic carbonate may be a multifunctional alkylene carbonate. In one aspect, the cyclic carbonate is a bi-functional cyclic carbonate oligomer such as five-membered dicyclic carbonate bis[(2-oxo-1,3-dioxolan-4-yl) methyl] benzene-1,4-dicarboxylate, 1,2-bis[4-(1,3-dioxan-2-one-4-yl)-butylthio]ethane, and combinations thereof.

In another aspect, the cyclic carbonate is a thioether with bis-cyclic carbonate prepared by a one-step reaction by thiol-ene coupling of dithiol and glycerol carbonate derivatives. For example, the cyclic carbonate may be a bis-cyclic carbonate prepared from 4-(3-butenyl)-1,3-dioxolan-2-one, 4-ethenyl-1,3-dioxolan-2-one, 4-[(prop-2-en-1-yloxy) methyl]-1,3-dioxolan-2-one, or a combination thereof.

In one embodiment, the cyclic carbonate is limonene dicarbonate. In another embodiment, the cyclic carbonate includes cyclic carbonate functional $SiO_2$ nanoparticles. Without being bound by any particular theory, the $SiO_2$ nanoparticles may improve adhesion and reduce water absorption.

In other aspects, the cyclic carbonate may be a six-membered cyclic carbonate functional monomer, a six-membered cyclic carbonate functional oligomer, a six-membered bis-cyclic carbonate functional oligomers, or combinations thereof. In some embodiments, the six-membered cyclic carbonate may be trimethylene carbonate, 5-(2-propenyl)-1,3-dioxan-2-one, 1,2-bis[3-(1,3-dioxan-2-one-5-yl)-propylthio]ethane, divinyl benzene dicyclocarbonate, or a combination thereof. In some embodiments, the cyclic carbonate may be one of the six-membered cyclic carbonate prepared from trimethylol propane as those derivatives shown below:

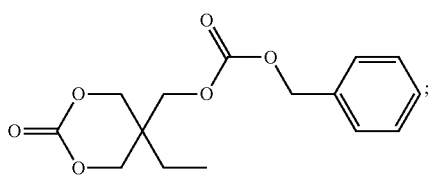

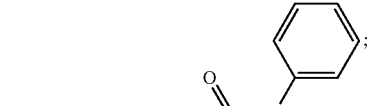

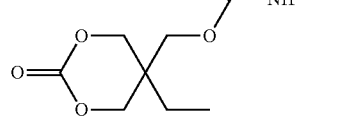

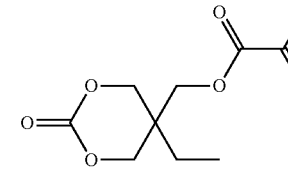

-continued

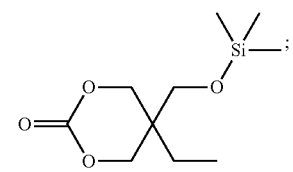

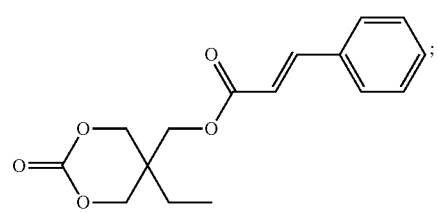

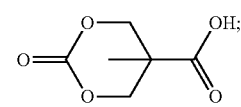

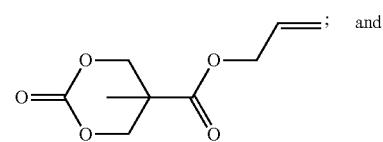; and

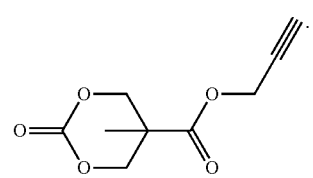

In still other aspects, the cyclic carbonate may include both five-and six-membered moieties. For example, the cyclic carbonate may be a bis(functional) compound such as the following:

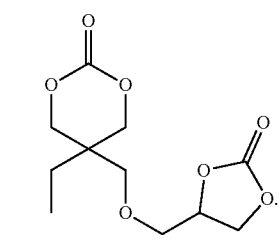

(5-ethyl-5-(((2-oxo-1,3-dioxolan-4-yl)methoxy)methyl)-1,3-dioxan-2-one)

Chain Extender

The chain extender may be a polyamine. Suitable polyamines include, but are not limited to, 3,5-dimethylthio-(2,4-or 2,6-)toluenediamine, or an isomer thereof; 3,5-diethylthio-(2,4-or 2,6-)toluenediamine, or an isomer thereof; 3,5-diethyltoluene-(2,4-or 2,6-)diamine, or an isomer thereof; 4,4'-bis-(sec-butylamino)-diphenylmethane; 1,2-or 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p, p'-methylene dianiline; phenylenediamine; 3,3'-dichloro-4,4'-diamino-diphenylmethane (i.e., 4,4'-methylene-bis-(2-chloroaniline)); 3,3'-dichloro-2,2',6,6'-tetraethyl-4,4'-diamino-diphenylmethane; 3,3'-diethyl-5,5'-dichloro-4,4'-diamino-diphenylmethane; 3,3',5,5'-tetraethyl-4,4'-diamino-diphenylmethane (i.e., 4,4'-methylene-bis-(2,6-diethylaniline); 3,3'-diethyl-5,5'-dimethyl4,4'-diamino-diphenylmethane (i.e., 4,4'-methylene-bis (2-ethyl-6-methyl-benezeneamine)); 3,3'-dimethyl-4,4'-diamino-diphenylmethane, 3,3'-diethyl-5,5'-dimethyl-4,4'-diamino-diphenylmethane; 2,2',3,3'-tetrachloro-diamino-diphenylmethane; 2,2'-dichloro-3,3',5,5'-tetraethyl-4,4'-diamino-diphenylmethane (i.e., 4,4'-methylene-bis-(3-chloro-2,6-diethylaniline); 2,2',3,3'-tetrachloro-4,4'-diamino-diphenylmethane (i.e., 4,4'-methylene-bis(2,3-dichloroaniline)); N,N,N',N'-tetramethylethylene diamine; N,N,N',N'',N''-pentamethyldiethylene triamine; triethylene tetramine; and combinations thereof. In some embodiments, the chain extender is a primary amine. In other embodiments, the chain extender is a secondary amine.

In one aspect, the chain extender is a diamine-diamide. More specifically, the chain extender may be terminated with amino groups where the backbone includes a diamide. For example, the chain extender may be based on the condensation product of excess hexamethylenediamine and dimethyl terephthalate and have the following structure:

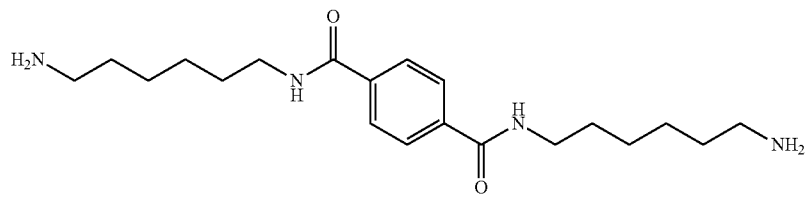 [SMILES: NCCCCCCNC(=O)c1ccc(C(=O)NCCCCCCN)cc1]

In other embodiments, the chain extender is hydroxy-terminated. In this aspect, suitable hydroxy-terminated chain-extenders may include, but are not limited to, short chain or long chain polyols. Suitable hydroxy-terminated chain extenders include, but are not limited to ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Hydroxyurethane compositions of the present disclosure may be produced via a "one-step" approach or a "two-step" prepolymer approach. More specifically, in some embodiments, the components are mixed and reacted simultaneously. In other embodiments, the cyclic carbonate and amine-terminated soft segment are reacted, followed by chain extension.

In some embodiments, the resulting hydroxyurethane composition may be PEG-based, e.g.,

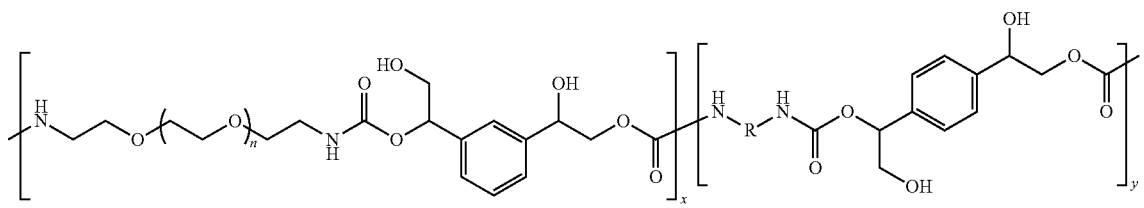

or PTMEG-based, e.g.,

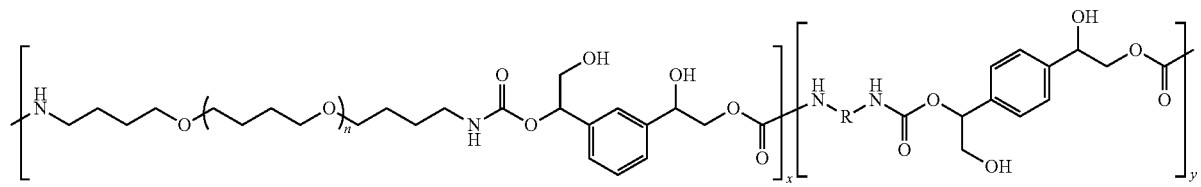

where x and y independently are 1 to 10 and R may be

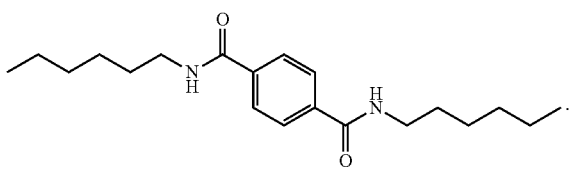 [SMILES: CCCCCCNC(=O)c1ccc(C(=O)NCCCCCC)cc1]

Without being bound by any particular theory, the additional hydroxyl groups in the polyurethane compositions of the present disclosure (which are not present in conventional polyurethanes having only urethane linkages) improve the adhesion to the underlying layer or component. Moreover, the presence of carbonate groups provide an opportunity for post-functionalization, such as further curing reactions under mild conditions. Furthermore, without being bound by any particular theory, the lack of biuret and allophanate linkages in the compositions of the present disclosure may results in increased chemical resistance, lower permeability, and better thermal stability than conventional (isocyanate-based) polyurethane compositions. In addition, because there is no side reaction with water to cause gas formation, the compositions of the present disclosure lack porosity.

Additives

The compositions of the present disclosure may also include fillers, additives, and other ingredients that do not detract from (and possibly enhance) the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Polymeric, ceramic, metal, and glass microspheres also may be used. Generally, the additives will be present in the composition in an amount between about 1 and about 70 weight percent based on total weight of the composition depending upon the desired properties.

Because the reaction of cyclic carbonates with amines is usually slower than the typical reaction of rapid reaction of isocyanates with alcohols (at ambient conditions), a catalyst may be employed to promote the reaction between the cyclic carbonate and amine compounds or between prepolymer and chain-extender during the chain-extending step. Suitable catalysts include, but are not limited to, bismuth catalyst; zinc octoate; stannous octoate; tin catalysts such as di-butyltin dilaurate, bis-butyltin dilaurate, bis-butyltin diacetate, stannous octoate; tin (II) chloride, tin (IV) chloride, bis-butyltin dimethoxide, dimethyl-bis[1-oxonedecyl)oxy] stannane, di-n-octyltin bis-isooctyl mercaptoacetate; amine catalysts such as triethylenediamine, triethylamine, and tributylamine; organic acids such as oleic acid and acetic acid; delayed catalysts; and combinations thereof. In particular, such catalysts are suitable for use to promote the reaction between an isocyanate-containing component, e.g., a blocked isocyanate (once unblocked), and an isocyanate-reactive component, e.g., an amine-terminated component or a hydroxy-terminated component. In other embodiments, suitable catalysts include tertiary amines such as 1,8-diazobicyclo[5.4.0]undec-7-ene (DBU), 1,5,7-triazabicyclo [4.4.0]dec-5-ene (TBD), and 1-[3,5-bis (trifluoromethyl) phenyl]-3-cyclohexylthiourea (TU); lewis acids and bases and combinations thereof such as those disclosed in U.S. Pat. No. 9,260,564, the entire disclosure of which is incorporated by reference herein; phenols; and mixtures thereof. In this regard, such catalysts are particularly useful to promote the reaction between the cyclic carbonate and amine-terminated component. In some embodiments, the catalyst is one of the following phenols:

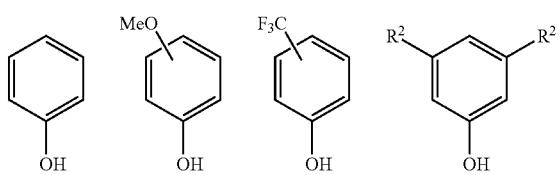

The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

Hybrid Hydroxyurethane Compositions

As discussed briefly above, the compositions of the present disclosure may be a hybrid hydroxyurethane-urethane or hydroxyurethane-urea. In this regard, the hybrid hydroxyurethane may include both hydroxyurethane linkages and urethane and/or urea linkages.

For example, in addition to the hydroxyurethane linkages, the composition may include the following urethane linkage(s):

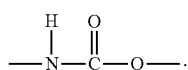

In this aspect, a "conventional" prepolymer (CPP) formed with an isocyanate-containing component and an isocyanate-reactive component and containing urethane linkages may be exposed to the cyclic carbonate, i.e., all isocyanate groups in the CPP are reacted with the cyclic carbonate to form a capped prepolymer. Indeed, the capped prepolymer includes cyclic carbonate functionality, but no isocyanate moieties. The capped prepolymer is then chain extended with an amine-terminated component to produce a composition with urethane and hydroxyurethane linkages (and no cyclic carbonate functionality).

In another aspect, the compositions of the present disclosure may also be a hybrid hydroxyurethane-urea. In this regard, the hybrid hydroxyurethane-urea may include both hydroxyurethane and urea linkages. For example, in addition to the hydroxyurethane linkages, the composition may include the following urea linkage(s):

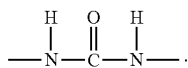

In this aspect, the CPP formed with an isocyanate-containing component and an isocyanate-reactive component and containing urea linkages may be exposed to the cyclic carbonate to form a capped prepolymer and then chain extended with an amine-terminated component to produce hydroxyurethane linkages.

In other embodiments, a blocked isocyanate is employed to form a hybrid hydroxyurethane-urethane or hydroxyurethane-urea composition. In this aspect, the cyclic carbonate and amine-terminated component are allowed to partially or fully react before the isocyanate groups in the blocked isocyanate are unblocked (either by increasing the temperature to at least 190° F. or more or through an exothermic reaction) exposing the isocyanate groups for crosslinking. Once unblocked, an amine-terminated or hydroxy-terminated chain extender is added to produce the urea or urethane linkages.

Suitable blocked isocyanates include, but are not limited to, an isocyanate-containing component that contains at least one isocyanate group blocked with a blocking agent. In some embodiments, the blocked isocyanate includes a first isocyanate group blocked with a first blocking agent and a second isocyanate group blocked with a second blocking agent.

In this aspect, greater than about 80 percent of the isocyanate radicals may be blocked. In one embodiment, about 90 percent or greater of the isocyanate radicals are blocked. In another embodiment, about 95 percent or more of the isocyanate radicals are blocked. In another embodiment, about 97 percent or more of the isocyanate radicals are blocked. In still another embodiment, substantially all of the isocyanate radicals are blocked.

The blocking agent may be any suitable blocking agent that results in the prevention of premature polymerization or crosslinking of the isocyanate groups. Suitable blocking agents include, but are not limited to, linear and branched alcohols; phenols and derivatives thereof, such as xylenol; oximes, such as methyl ethyl ketoxime; lactams, such as ε-caprolactam; lactones, such as caprolactone; dicarbonyl compounds; hydroxamic acid esters; bisulfite addition compounds; hydroxylamines; esters of phydroxybenzoic acid; N-hydroxyphthalimide; N-hydroxysuccinimide; triazoles; substituted imidazolines; tetrahydropyrimidines; caprolactones; and mixtures thereof. In one embodiment, the blocking agent is selected from the group consisting of phenols, branched alcohols, methyl ethyl ketoxime, ε-caprolactam, ε-caprolactone, and mixtures thereof.

In some aspects, the blocking agent may be represented by general formula (1) below:

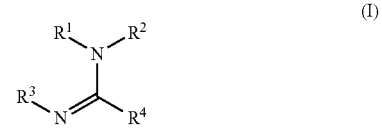

where $R^1$ to $R^3$ represent a hydrocarbon group having 1 to 12 carbon atoms or a hydrogen atom and at least one of $R^1$ to $R^3$ represents a hydrogen atom, and R1 and R3 may be bonded to each other to form a heterocycle. $R^4$ may represents a hydrocarbon group having 1 to 12 carbon atoms, a hydrogen atom, or an atomic group represented by $-NR_5R_6$ ($R_5$ and $R_6$ each represent a hydrocarbon group having 1 to 12 carbon atoms, and $R_5$ and $R^1$ may be bonded to each other to form a heterocycle, and $R_6$ and $R^3$ may be bonded to each other to form a heterocycle).

In other embodiments, the blocking agent may have a dissociation temperature of 130° C. or less. For example, the dissociation temperature of the blocking agent may be 50° C. to about 120° C.

The present disclosure is not limited by the use of particular isocyanate-containing components or isocyanate-reactive components in the CPP or blocked isocyanate. Suitable isocyanates for the CPP or blocked isocyanate may be aromatic or aliphatic in nature. Nonlimiting examples of polyisocyanates for use in the CPP or blocked isocyanate include 4,4'-diphenylmethane diisocyanate("MDI"), polymeric MDI, carbodiimide-modified liquid MDI, 4,4'-dicyclohexylmethane diisocyanate ("H$_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate("IPDI"), hexamethylene diisocyanate ("HDI"), naphthalene diisocyanate ("NDI"); xylene diisocyanate ("XDI"); p-methylxylene diisocyanate; m-methylxylene diisocyanate; o-methylxylene diisocyanate; para-tetramethylxylene diisocyanate ("p-TMXDI"); meta-tetramethylxylene diisocyanate ("m-TMXDI"); ethylene diisocyanate; propylene-1,2-diisocyanate; tetramethylene-1, 4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. In one embodiment, the polyisocyanate is selected from MDI, PPDI, TDI, and combinations thereof. In another embodiment, the polyisocyanate includes MDI. It should be understood that, as used herein, the term "MDI" includes 4,4'-diphenylmethane diisocyanate, polymeric MDI, carbodiimide-modified liquid MDI, H$_{12}$MDI, and combinations thereof.

In some aspects, the blocked isocyanates suitable for use in accordance with the present disclosure include isophorone diisocyanate (IPDI)-based uretdione-type crosslinkers; a combination of a uretdione adduct of IPDI and a partially ε-caprolactam-modified IPDI; a combination of isocyanate adducts modified by ε-caprolactam and a carboxylic acid functional group; a caprolactam-modified Desmodur diisocyanate; a Desmodur diisocyanate having a 3,5-dimethyl pyrazole modified isocyanate; and combinations thereof.

Suitable isocyanate-reactive components for use in the CPP includes polyols and polyamines. In this aspect, suitable polyols include, but are not limited to, polyether polyols, hydroxy-terminated polybutadienes, polyester polyols, polycaprolactone polyols, polycarbonate polyols, and combinations thereof. In this aspect, the polyol may include any one of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl)ether; trimethylol propane; and combinations thereof. Suitable polyamines include any aliphatic or aromatic compound containing two or more primary or secondary amine functional groups. In this aspect, the polyamine compound may have any suitable backbone chain structure including saturated or unsaturated, and linear, branched, or cyclic.

In one embodiment, the ratio of hydroxyurethane: urethane linkages is about 50:1 to about 2:1. In another embodiment, the ratio of hydroxyurethane: urethane linkages is about 50:1 to about 10:1. Similarly, the ratio of hydroxyurethane: urea linkages is about 50:1 to about 2:1. In another embodiment, the ratio of hydroxyurethane: urea linkages is about 50:1 to about 10:1.

The compositions of the present disclosure may be thermoplastic or thermoset. When thermoplastic, there is minimal cross-linking, e.g., any bonding in the polymer network is primarily through hydrogen bonding or other physical mechanism. Because of their lower level of cross-linking, thermoplastic compositions are relatively flexible and the cross-linking bonds can be reversibly broken by increasing temperature such as during molding or extrusion. When thermoset, there is a high level of cross-linking. Because of their high level of cross-linking, thermoset compositions are relatively rigid and the cross-linking bonds are irreversibly set and are not broken when exposed to heat.

The compositions of the present disclosure may have a Shore D hardness that ranges from about 20 to about 75. In one embodiment, the hardness is about 30 to about 70 Shore D. In another embodiment, the hardness is about 40 to about 60 Shore D. In still another embodiment, the Shore D hardness of the composition is about 45 to about 55.

The flexural modulus of the compositions of the present disclosure may range from about 1700 psi to about 80,000 psi. In one embodiment, the composition has a flexural modulus of about 1700 psi to about 35,000 psi. In another embodiment, the flexural modulus of the composition ranges from about 10,000 psi to about 75,000 psi. In still another embodiment, the composition has a flexural modulus of about 3000 psi to about 70,000 psi.

Golf Balls

Golf balls formed in accordance with the present disclosure include at least a core and a cover. Without being bound to any particular theory, the polyurethane compositions of the present disclosure are as durable and resilient as conventional elastomeric compositions without any sacrifices of performance or processability. In some embodiments, golf balls formed in accordance with the present disclosure have a cover layer formed from the polyurethane compositions of the present disclosure.

Figure 2:
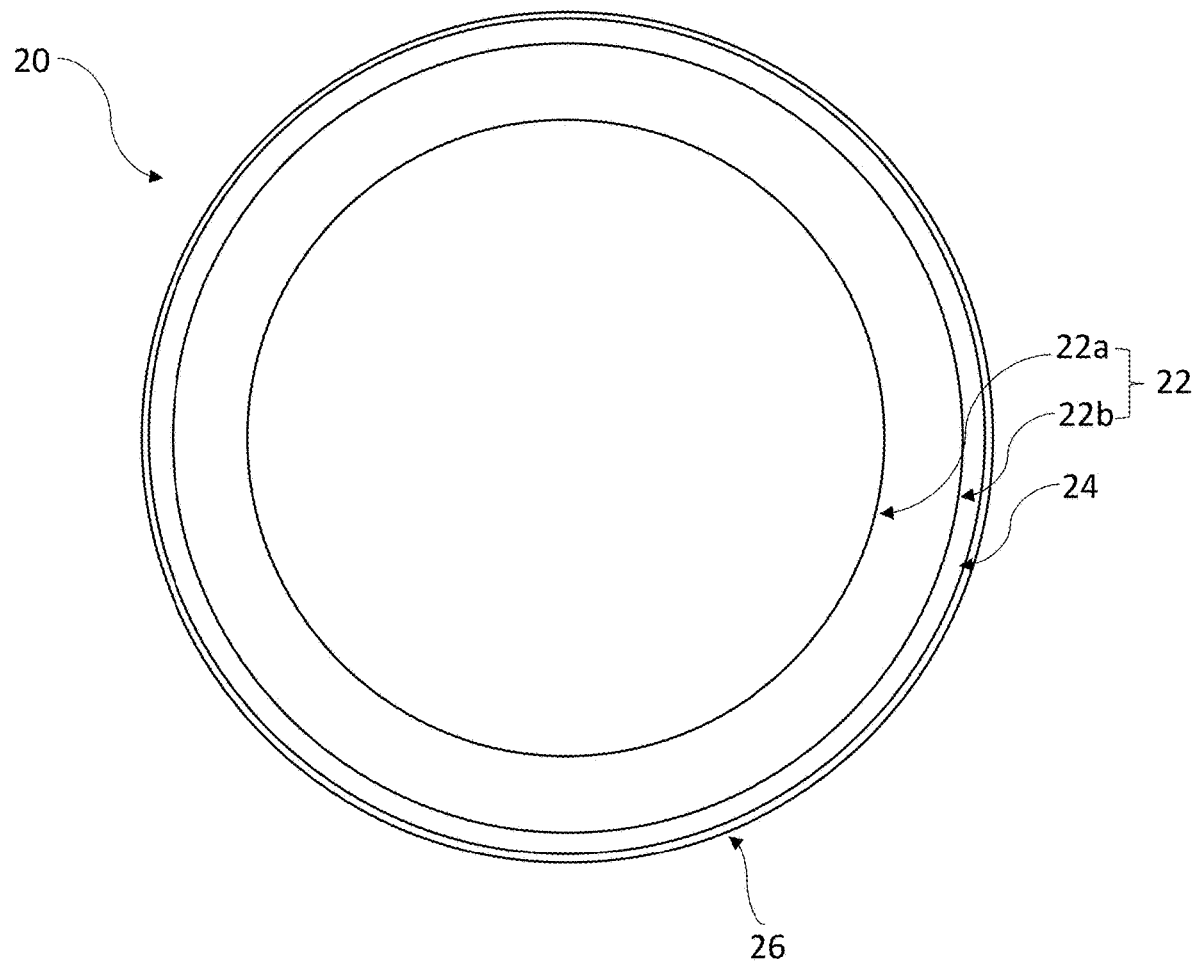
FIG. 2 is a cross-sectional view of a four-piece golf ball in accordance with an embodiment of the present disclosure.
Figure 3:
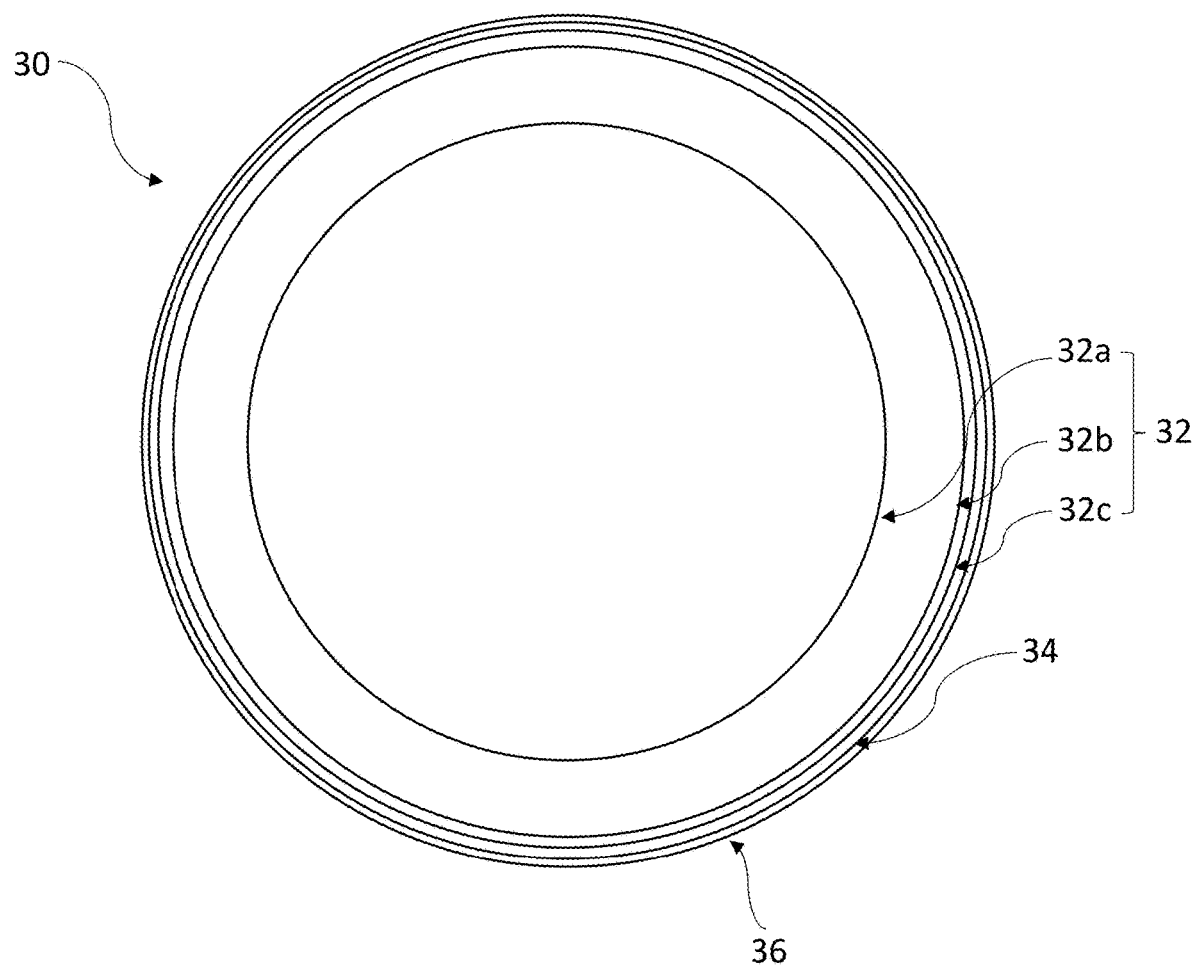
FIG. 3 is a cross-sectional view of a five-piece golf ball in accordance with an embodiment of the present disclosure.

Referring to FIG. 1, in one version, a three-piece golf ball 10 can be made in accordance with the present disclosure. The ball 10 contains a core 12, a cover 16, and an optional layer 14 disposed between the core 12 and the cover 16. Referring to FIG. 2, in one version, a four-piece golf ball 20 can be made in accordance with this invention. The ball 20 contains a center 22, an outer core layer 24, a cover 28, and a layer 26 disposed between the outer core layer and the cover 28. Referring to FIG. 3, in another version, a five-piece golf ball 30 contains a core 32 including a center 32a, an outer core layer 32c, and an inner core layer 32b disposed between the center 32a and the outer core layer 32c, a cover 36, and a layer 34 disposed between the core 32 and the cover 36. In any of these embodiments, the layer 14, 26, and 34 may be considered an intermediate layer, casing or mantle layer, or inner cover layer, or any other layer disposed between the core assemblage and the outer cover of the ball. In any of these embodiments, the cover 16, 28, or 36 may be formed from a polyurethane composition of the present disclosure. In the alternative, in any of these embodiments, the layer 14, 26, or 34 may be formed from a polyurethane composition of the present disclosure.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In one embodiment, the golf ball diameter is about 1.68 to 1.74 inches. In another embodiment, the golf ball diameter is about 1.68 to 1.70 inches. For play outside of United States Golf Association(USGA) rules, the golf balls can be of a smaller size. In one embodiment, golf balls made in accordance with this invention have a diameter in the range of about 1.68 inches or less, e.g., 1.55 inches to about 1.68 inches.

The core of a golf ball formed in accordance with the present disclosure may include a solid sphere or a center and at least one core layer disposed thereon. Core components may be formed from a rubber formulation. In one embodiment, the rubber formulation includes a base rubber in an amount of about 5 percent to 100 percent by weight based on total weight of formulation. In one embodiment, the base rubber is included in the rubber formulation in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the rubber formulation in an amount of about 40 percent to about 95 percent by weight based on the total weight of the formulation. In one embodiment, the rubber formulation includes about 55 percent to about 95 percent base rubber based on the total weight of the formulation.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

The co-agent may be included in the rubber formulation in varying amounts depending on the specific core component for which the rubber formulation is intended. In one embodiment, the amount of co-agent used in the rubber formulations increases for each outer component of the core assemblage. In other words, the co-agent in the rubber formulation for the center is included in a first amount and the co-agent in the rubber formulation for the outer core layer is included in a second amount. The second amount may be more than the first amount. In this aspect, the first amount may be about 25 percent to about 90 percent of the second amount. For example, the first amount may be about 40 percent to about 80 percent of the second amount. In one embodiment, the first amount is about 60 percent to about 75 percent of the second amount.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation.

The rubber formulation may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core diameter may range from about 1.50 inch to about 1.60 inch. In one embodiment, the core has a diameter of about 1.52 inch to about 1.58 inch. In another embodiment, the core diameter ranges from about 1.54 inch to about 1.56 inch.

When the cover of a golf ball formed in accordance with the present disclosure is not formed of a polyurethane composition of the present disclosure, such layer(s) may be formed from a variety of materials may be used for forming the cover including, for example, conventional polyurethanes and polyureas; copolymers, blends and hybrids of conventional polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; cross-linked trans-polyisoprene and blends thereof; polyester-based thermoplastic elastomers; polyurethane-based thermoplastic elastomers; synthetic or natural vulcanized rubber; and combinations thereof.

Likewise, when the layer disposed between the core and the cover (if included) is not formed of a polyurethane composition of the present disclosure, conventional and non-conventional materials may be used for forming such layer(s) of the ball including, for instance, ionomer resins, highly neutralized polymers, polybutadiene, butyl rubber, and other rubber-based core formulations, and the like. In this aspect, ionomers suitable for use in accordance with the present disclosure may include partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70 percent of all acid groups present in the composition are neutralized.

Suitable ionomers may be salts of O/X- and O/X/Y-type acid copolymers, wherein O is an α-olefin, X is a $C_3$-$C_8$, α,β-ethylenically unsaturated carboxylic acid, and Y is a softening monomer. O is preferably selected from ethylene and propylene. X may be selected from methacrylic acid, acrylic acid, ethacrylic acid, crotonic acid, and itaconic acid, Y may be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Nonlimiting examples of O/X and O/X/Y-type copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

"Low acid" and "high acid" ionomeric polymers, as well as blends of such ionomers, may be used. In general, low acid ionomers are considered to be those containing 16 weight percent or less of acid moieties, whereas high acid ionomers (e.g., Surlyn® 8150) are considered to be those containing greater than 16 weight percent of acid moieties. In one embodiment, the inner cover layer is formed from a composition comprising a high acid ionomer. In another embodiment, the inner cover layer is formed from a composition comprising a high acid ionomer and a maleic anhydride-grafted non-ionomeric (e.g., Fusabond® 525D (DuPont)). Blends of high acid ionomers with maleic anhydride-grafted polymers are further disclosed, for example, in U.S. Pat. Nos. 6,992,135 and 6,677,401, the entire disclosures of which are hereby incorporated herein by reference.

Any of the layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents such as pigments and dyes, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, and mixtures thereof.

The outermost cover layer preferably has a material hardness of 85 Shore C or less. The thickness of the outermost cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail herein. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core as described herein, a layer disposed on the core formed from an ionomeric material, and a cover formed from a polyurethane composition of the present disclosure, and the cover has a hardness that is less than that of the layer disposed between the core and the cover. For example, the layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In an alternative embodiment, the layer disposed between the core and the cover is formed of a polyurethane composition of the present disclosure and the cover is formed of an ionomeric material. In this alternative embodiment, the layer disposed between the core and the cover may have a hardness of less than about 60 Shore D and the cover may have a hardness of greater than about 55 Shore D and the layer disposed between the core and the cover has a hardness that is less than the cover hardness.

When a dual cover is disposed about the core, the layer disposed between the core and the cover may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

A golf ball formed in accordance with the present disclosure has a Coefficient of Restitution (CoR) of at least 0.750 and more preferably at least 0.800 (as measured per the test methods below). Such COR allows players to generate greater ball velocity off the tee and achieve greater distance with their drives. At the same time, a golf ball including a cover or an inner cover formed of a thermoplastic elastomer composition of the present disclosure means that a player will have a more comfortable and natural feeling when striking the ball with a club. Furthermore, such golf balls have good shear durability and mechanical strength.

The shear durability of a golf ball of the present disclosure, which is manifest as the ability of a golf ball to maintain its mechanical stability and integrity upon the application of a shear stress to that golf ball, is preferably comparable or greater than a golf ball formed with a conventional thermoplastic polyurethane cover. As shown in Table 1 below, a "shear durability rating" is a qualitative, or relative, scale that incorporates shear mode (i.e., cut/damaged cover, abrasion type damage, and/or paint damage) and severity and weighs them accordingly to make ratings/scores averageable and errors less impactful of overall scores into a scale.

TABLE 1

Shear Durability Rating Scale

| Rating | Cut/Damaged Cover | Abrasion Type Damage | Paint Damage |
| --- | --- | --- | --- |
| 1 | Cut or Cracked Cover with casing layer exposed | | |
| 2 | Severe cover damage with multiple groove marks and deep gouges | | |
| 3 | Moderate cover damage with more than one groove mark, missing or severely raised cover material | | |
| 4 | Moderate cover damage with one larger or several smaller groove mark, raised cover material | Severe abrasion damage, quarter sized are of planed off frets with noticeably altered dimples | |
| 5 | Slight cover damage of one or two groove marks with cover that is cut but not raised or one or two very small, raised pieces | Moderate to severe abrasion with multiple groove marks of removed fret areas, slightly noticeable dimple changes | |
| 6 | Very slight cover damage with one small area of cut cover, but not raised. Sand impregnation | Moderate abrasion damage. Frets are planed off in small dime sized area or one larger (3-4 dimples long) groove mark | Severe paint failure with missing paint on a quarter sized area or greater |
| 7 | | Abrasion of a dime sized area with no major alteration of fret areas | More severe paint damage with missing paint on two or more groove marks |
| 8 | | Minor scratches and abrasion of paint and possible cover abrasion | Moderate paint damage. One to two longer (3-4 dimples long) groove marks with interrupted paint or one groove mark with missing paint only |
| 9 | | | Slight paint damage with only one larger or several smaller groove mark of interrupted paint |
| 10 | | | No damage |

In other words, the higher the shear durability rating is, the higher the shear durability of the material. The shear durability rating above can be determined by using a mechanical golf swing machine where one hit is made on each of about 6 to 12 substantially identical golf balls of substantially the same composition with either a sand wedge or a pitching wedge. After a suitable calibration procedure, each experimental golf ball may be tested and assigned a rating based upon visible manifestations of damage after being struck. The shear durability rating for a golf ball with a particular cover represents a numerical average of all the tested substantially identical golf balls. An alternative way to test shear resistance of a golf ball cover involves using player-testing and evaluating the results after the ball is struck multiple times with wedges and/or short irons.

In one embodiment, a golf ball formed in accordance with the present disclosure, i.e., with a cover layer formed of a polyurethane composition as disclosed herein, has a shear durability rating of at least 6. In another embodiment, the shear durability of a golf ball formed in accordance with the present disclosure is at least 7. In still another embodiment, a golf ball formed in accordance with the present disclosure, i.e., with a cover layer formed of a thermoplastic elastomer composition as disclosed herein, has a shear durability rating of at least 8. In some aspects, the shear durability of a golf ball formed in accordance with the present invention, i.e., with a cover formed of a polyurethane composition as disclosed herein, is comparable to or better than a golf ball with a conventional polyurethane cover (holding all of the other ball components constant).

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

In this aspect, different molding operations may be used to form a layer of the golf ball using the compositions of the present disclosure. For example, compression-molding, casting, and injection-molding processes can be used. In some embodiments, the polyurethane compositions of the present disclosure are cast. More particularly, in such an embodiment, the prepolymer and curing agent can be mixed in a motorized mixer inside a mixing head by metering amounts of the curative and prepolymer through the feed lines. Preheated lower mold cavities may be filled with the reactive prepolymer and curing agent mixture. Likewise, the preheated upper mold cavities can be filled with the reactive mixture. The lower and upper mold cavities are filled with substantially the same amount of reactive mixture. After the reactive mixture has resided in the lower mold cavities for a sufficient time period, typically about 40 to about 100 seconds, the golf ball subassembly can be lowered at a controlled speed into the reacting mixture. Ball cups can hold the subassemblies by applying reduced pressure (or partial vacuum). After sufficient gelling (typically about 4 to about 12 seconds), the vacuum can be removed and the subassembly can be released. Then, the upper half-molds can be mated with the lower half-molds. An exothermic reaction occurs when the polyurethane prepolymer and curing agent are mixed and this continues until the material solidifies around the subassembly. The molded balls can then be cooled in the mold and removed when the molded cover layer is hard enough to be handled without deforming. Such molding techniques are explained in more detail in U.S. Pat. Nos. 6,132,324, 5,334,673 and 5,006,297, the disclosures of which are hereby incorporated by reference.

In other embodiments, the compositions of the present disclosure (in thermoplastic pellets) are molded into a layer using retractable pin injection-molding (RPIM) methods. In this aspect, upper and lower mold cavities may be mated together. The upper and lower mold cavities form a spherical interior cavity when they are joined together. If an outer cover layer, the mold cavities used to form the layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer.

Golf balls made in accordance with the present disclosure may be subjected to finishing steps such as flash-trimming, surface-treatment, marking, coating, and the like using techniques known in the art. In some embodiments, prior to forming the cover layer, the ball subassembly may be surface-treated to increase the adhesion between its outer surface and cover material. Examples of such surface-treatment may include mechanically or chemically abrading the outer surface of the subassembly. In addition, the subassembly may be subjected to corona discharge, plasma treatment, silane dipping, or other chemical treatment methods known to those of ordinary skill in the art prior to forming the cover around it. Other layers of the ball, for example, the core and cover layers, also may be surface-treated. Examples of these and other surface-treatment techniques can be found in U.S. Pat. No. 6,315,915, the disclosure of which is hereby incorporated by reference.

Indicia such as trademarks, symbols, logos, letters, and the like may be printed on the cover using pad-printing, ink-jet printing, dye-sublimation, or other suitable printing methods. Clear surface coatings (for example, primer and top-coats), which may contain a fluorescent whitening agent, may be applied to the cover. Golf balls may also be painted with one or more paint coatings in a variety of colors. In one embodiment, white primer paint is applied first to the surface of the ball and then a white topcoat of paint may be applied over the primer.

EXAMPLES

The following examples illustrate golf balls formed in accordance with the present disclosure.

Examples 1-7

In each example provided below, the golf balls include a rubber core with an ionomer layer disposed thereon. The thin cover is formed from variations of the polyurethane compositions of the present disclosure(Examples 1-7). The hard segment (HS) is a cyclic carbonate such as divinyl benzene dicyclocarbonate, the soft segment (SS) is an amine-terminated PEG or PTMEG as indicated in Table 1, and the chain extender (CE) is a diamine-diamide. More specifically, once the cyclic carbonate, CE, and amine-terminated component are combined, N,N-dimethylacetamide is added to dissolve the reactants and adjust the carbonate concentration of 0.25 M. The mixture is then allowed to react at 120° C. for 24 hours. After 24 hours, the polymer solution is dried.

TABLE 1

| | Cover Compositions | | |
|---|---|---|---|
| Example | HS | Molar Ratio (HS/SS/CE) | % HS[1] |
| 1 | PEO | 1.5/1/0.5 | 25 |
| 2 | PEO | 1.8/1/1 | 34 |
| 3 | PEO | 2.5/1/1.5 | 41 |
| 4 | PTMO | 1.25/1/0.25 | 19 |
| 5 | PTMO | 1.33/1/0.33 | 21 |
| 6 | PTMO | 1.5/1/0.5 | 25 |
| 7 | PTMO | 2/1/1 | 34 |

[1](HS + CE)/total weight of composition.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
   a core; and
   a cover, wherein the cover is formed from a composition comprising hydroxyurethane linkages and urethane linkages, and wherein the composition comprises a first reaction product of at least one cyclic carbonate and at least one amine-terminated component and a second reaction product of an isocyanate-containing component and an isocyanate-reactive component.

2. The golf ball of claim 1, wherein the first reaction product further comprises a chain extender.

3. The golf ball of claim 2, wherein the chain extender comprises a diamide-diamine.

4. The golf ball of claim 1, wherein the cyclic carbonate comprises a five-membered cyclic carbonate, a six-membered cyclic carbonate, or a combination thereof.

5. The golf ball of claim 1, wherein the amine-terminated component comprises two primary functional amines at each end of a polyether polyol backbone.

6. The golf ball of claim 5, wherein the polyether polyol comprises polyoxytetramethylene glycol (PTMEG), polyoxyethylene glycol (PEG), polyethylene propylene glycol, polyoxypropylene glycol (PPG), or mixtures thereof.

7. The golf ball of claim 1, further comprising a layer disposed between the core and the cover.

8. The golf ball of claim 7, wherein the layer comprises an ionomer material.

9. A golf ball, comprising:
   a core; and
   a cover, wherein the cover is formed from a composition comprising hydroxyurethane linkages and urea linkages, and wherein the composition comprises a first reaction product of at least one cyclic carbonate, at least one amine-terminated component, and an amine-terminated chain extender, and a second reaction product of an isocyanate-containing component and an isocyanate-reactive component.

10. The golf ball of claim 9, wherein the amine-terminated chain extender comprises a diamine-diamide.

11. The golf ball of claim 9, wherein the cyclic carbonate comprises trimethylene carbonate, 5-(2-propenyl)-1,3-dioxan-2-one, 1,2-bis [3-(1,3-dioxan-2-one-5-yl)-propylthio] ethane, divinyl benzene dicyclocarbonate, or a combination thereof.

12. The golf ball of claim 9, wherein the amine-terminated component comprises two primary amine functional groups.

13. The golf ball of claim 9, further comprising a layer disposed between the core and the cover.

14. The golf ball of claim 13, wherein the layer comprises an ionomer material.

15. A method of forming a golf ball, comprising the steps of:
   providing a golf ball sub-assembly comprising at least one core layer;
   forming a first reaction product comprising hydroxyurethane linkages from the reaction product of a cyclic carbonate, an amine-terminated component, and a chain extender;
   adding an isocyanate-containing component to the first reaction product to form a second reaction product comprising hydroxyurethane and urethane and/or urea linkages; and
   forming a cover disposed about the sub-assembly, the cover comprising the second reaction product.

16. The method of claim 15, wherein the step of forming a first reaction product comprises providing a cyclic carbonate comprises a five-membered cyclic carbonate, a six-membered cyclic carbonate, or a combination thereof.

17. The method of claim 15, wherein the isocyanate-containing component is a blocked isocyanate.

18. The method of claim 17, wherein the step of adding further comprises the step of exposing the isocyanate groups to crosslinking.

19. The method of claim 15, wherein the cyclic carbonate comprises a six-membered cyclic carbonate functional monomer, a six-membered cyclic carbonate functional oligomer, a six-membered bis-cyclic carbonate functional oligomers, or combinations thereof.

20. The golf ball of claim 15, wherein the cyclic carbonate comprises cyclocarbonate functionality of equal to or greater than 2.

* * * * *